United States Patent [19]
Fowler et al.

[11] 4,160,242
[45] Jul. 3, 1979

[54] READING MACHINE

[76] Inventors: Gerald C. Fowler, 2305 Fairview Rd., Gadsden, Ala. 35901; Terence D. Hughey, 2405 Pine Forrest Dr., Norcross, Ga. 30093

[21] Appl. No.: 810,825

[22] Filed: Jun. 28, 1977

[51] Int. Cl.² .............................................. G06F 3/14
[52] U.S. Cl. .......................................... 340/711; 35/6; 35/35 B; 340/758; 340/762; 340/765; 340/799
[58] Field of Search .................. 340/324 R, 336, 337, 340/311, 365 R; 35/5, 6, 9 R, 35 B

[56] References Cited

U.S. PATENT DOCUMENTS

| | | | |
|---|---|---|---|
| 3,612,676 | 10/1971 | Ooba et al. | 35/6 |
| 3,751,825 | 8/1973 | Barrett | 35/6 |
| 3,925,779 | 12/1975 | Gerstenhaber | 340/337 |
| 3,932,859 | 1/1976 | Kyriakides et al. | 35/6 |
| 3,938,139 | 2/1976 | Day | 35/35 B |

*Primary Examiner*—Marshall M. Curtis
*Attorney, Agent, or Firm*—Beveridge, DeGrandi, Kline & Lunsford

[57] ABSTRACT

A reading machine for providing a visual display of textual material. Textual material is stored, e.g., in binary form, in a memory device. The stored binary form includes indexing signals enabling the rapid indexing of the textual material. The textual material desired for display is indicated by, for example, actuation of appropriate keys on a keyboard. The stored textual material is rapidly scanned until the portion is found which corresponds with the desired textual material. Rapid scanning then stops, and the desired textual material is displayed on a suitable display device while scanning occurs at a slower rate, suitable for reading of the displayed textual material. The scanning is controlled by a clock whose pulses are counted to activate a logic circuit which interrogates corresponding address locations within the memory. The clock pulses are counted at a first rate for rapid scanning and at a lower rate for reading.

13 Claims, 3 Drawing Figures

READING MACHINE

The present invention pertains to a reading machine. More particularly the present invention pertains to a machine by means of which textual material and other printed matter stored in a memory can be displayed on a screen for reading. The stored material can be selectively accessed to permit the operator to rapidly locate the desired portion for display. Once that portion is located, the display speed is reduced, permitting the operator to view the displayed material at any speed desired for reading. The machine might be used as a teaching machine in conjunction with the teaching of basic skills such as reading; likewise, the machine might be used as an aid in increasing reading speed by progressively increasing the speed at which the textual material is displayed. Alternatively, the apparatus can be used to store and display material from bulky sources, such as salesmen's catalogs.

Reading machines can be used in numerous applications. By way of example, in the field of education, teaching of basic reading skills can often be accomplished utilizing a reading machine. In addition, the teaching of skills permitting increase in reading speed is well suited for teaching machines which display text material at progressively increasing display speeds, causing the user to increase his reading speed so as to keep up with the displays. If desired, the reader's comprehension can be improved by displaying only a single line of text material at a time, so that the reader is not distracted by adjacent lines. Beyond this, reading machines can be used to display material from any text source. Thus, if a student has available a reading machine both in his classroom and in his place of study, he need not carry large, heavy books; instead, he merely needs to carry a magnetic tape, flexible disk, or other suitable memory device having the text material stored on it.

In accordance with the present invention, textual material is stored in a high density addressable memory device, for example in a digital form including both the textual material and indexing codes. The reading machine is provided with a keyboard by means of which the operator can indicate the portion of the textual material which is desired for display. The stored material is rapidly scanned until the index code of the desired portion is found. The stored textual material is then displayed at a speed comfortable for reading by the operator.

A variable speed clock has its output applied through a frequency control unit to a counter which provides address information to a comparison circuit for comparison with the index codes stored on the memory. When a comparison indicates that the desired textual material has been accessed, the clock rate is decreased to a rate resulting in display of the stored textual material on a suitable display device at a comfortable reading speed.

These and other aspects and advantages of the present invention are more apparent in the following detailed description and claims, particularly when considered in conjunction with the accompanying drawings. In the drawings:

Figure 1:
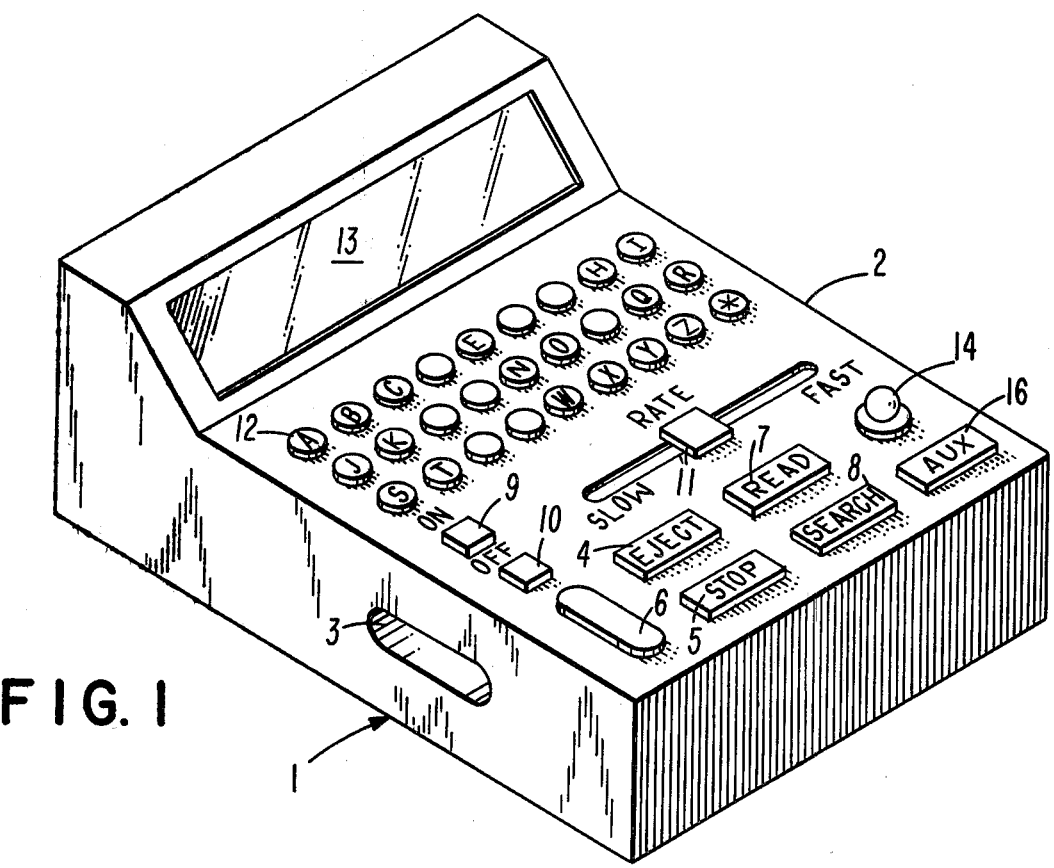
FIG. 1 is a perspective view of a reading machine in accordance with the present invention.

The reading machine 1 shown in FIG. 1 may be of any convenient size, limited only by the state of the art in microminiaturization of circuitry and display devices. Thus, the reading machine 1 may be of a size suitable for placement on a desk, table or other surface, or may be of a size convenient for holding in the hand, similar to a pocket calculator.

Reading machine 1 includes a casing 2 having an opening 3 for insertion of a suitable memory device. This memory device can be any desired type, by way of examples, a solid state, high density read only memory, a magnetic bubble memory, a flexible disc or floppy disc memory, or a magnetic tape memory. Reading machine 1 is further provided with a connector 6 to permit connection to an external memory for access to larger volumes of textual material, if desired. Reading machine 1 includes an eject button 4 enabling ready ejection of a memory device positioned within opening 3 when it is desired to replace that memory device with another memory device storing other textual material.

Reading machine 1 is provided with a number of text indicating controls 12, illustratively depicted in FIG. 1 as an array of pushbuttons which, for purposes of illustration, are shown as indicating the letters of the alphabet so that the textual material is alphabetically selected. Other text selection techniques could, of course, be utilized.

In operation, if the textual material is stored on a memory to be inserted into opening 3, once that is achieved, power control 9 is actuated to turn on power, then the desired text indication control 12 is actuated, and search control 8 is depressed. The reading device then scans the textual material stored on the memory until the desired portion is located. The scanning then stops, and indicator 14 is energized to indicate to the operator that the desired text portion has been located. Read control 7 is then depressed to cause scanning of the textual material at a speed suitable for reading as the textual material is displayed on display screen 13. The rate of display can be controlled by means of rate control 11. When it is desired to stop the scanning, either because no further reading is desired or because it is desired to study one line of textual material, stop control 5 is actuated. Scanning can be resumed by pushing read control 7. When the reading operation is completed, control 10 is actuated to turn off the power. Eject button 4 is likewise actuated to eject the memory device. If an external memory is utilized by means of connector 6, then auxiliary control 16 is depressed to cause proper operation with this external memory.

While display portion 13 has been illustrated as raised from the surface of casing 2, the display portion may be on the same level as the keyboard to provide a more compact device, if desired. Display portion 13 may be any suitable display including an electronic display such as a light emitting diode display, a liquid crystal diode display or a plasma display. The size of display portion 13 and the size of the individual characters of the display are determined by such considerations as the number of characters which are to be displayed at a time, the overall size of reading device 1, and the character size and density which are acceptable for comfortable viewing.

Figure 2:
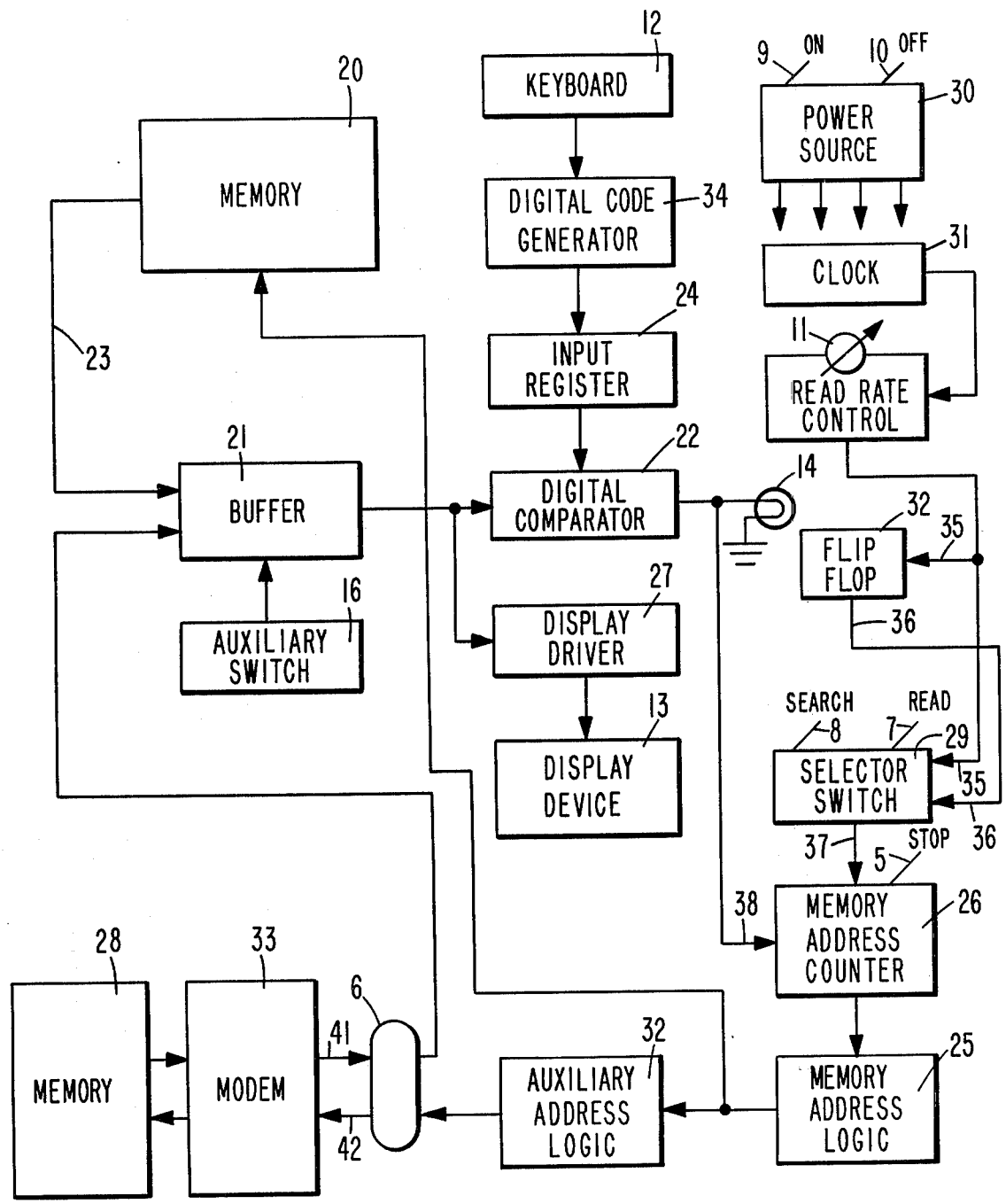
FIG. 2 is a block diagram of electronic circuitry suitable for incorporation into a reading machine in accordance with the present invention.

FIG. 2 depicts electronic circuitry suitable for incorporation into reading machine 1. On control 9 and off control 10 are utilized to control a power source 30 which might be a battery, an alternating current power source, or other suitable source. Power source 30 provides power for the various components within reading device 1. The text indicating controls 12 activate digital code generator 34. The output signals of digital code generator 34 indicate the particular text indicating control 12 which has been actuated. These output signals are stored in input register 24. Clock 31, which can be a variable oscillator such as a variable frequency, free-running multivibrator, includes rate control 11 which controls the frequency of output pulses from clock 31. The clock pulses at the desired rate are applied on line 35 both directly to selector switch 29 and to the input of binary scaler or flip-flop network 32. The binary scaler network 32 acts as a frequency divider, and its output is applied by line 36 to selector switch 29. When search switch 8 is actuated on selector switch 29, line 35 is coupled by selector switch 29 to line 37 so that the clock pulses from clock 31 and control 11 are applied directly to memory address counter 26. When read control 7 is actuated, line 36 is coupled to line 37 so that the clock pulses at a rate controlled by binary scaler network 32 are applied to memory address counter 26.

Figure 3:
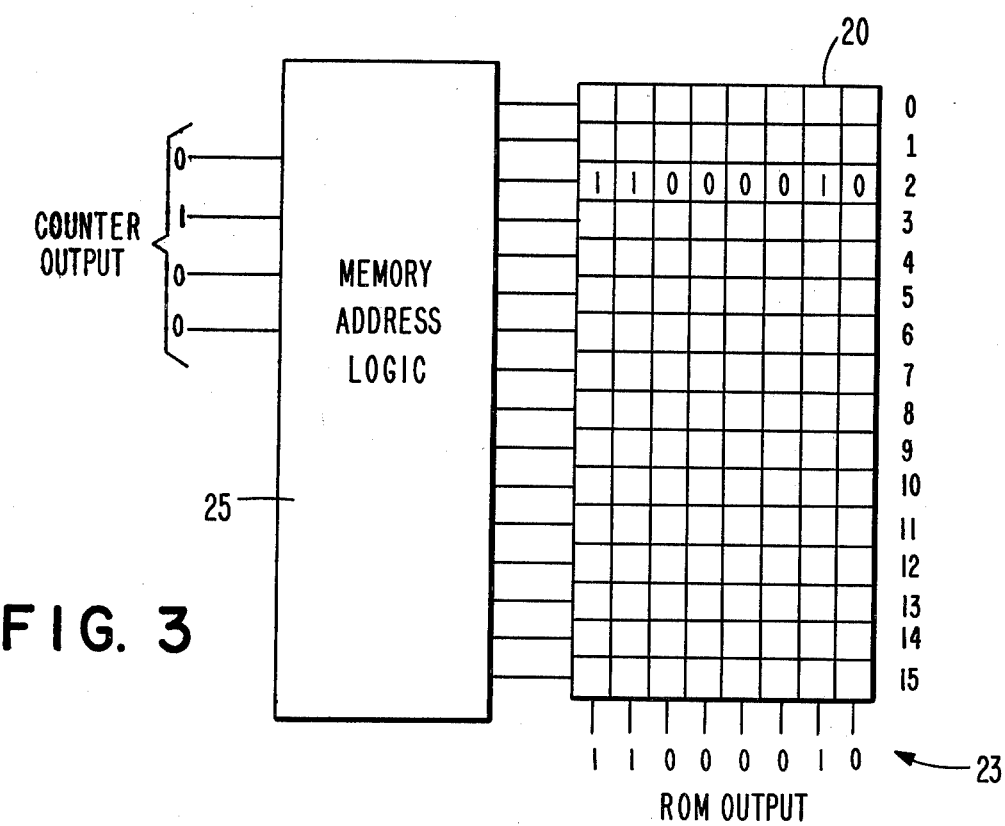
FIG. 3 is a block diagram of a memory suitable for incorporation into the circuitry of FIG. 2 in accordance with the present invention.

The count signal output of memory address counter 26 is applied to memory address logic unit 25 which in response applies selected address signals to memory 20. FIG. 3 depicts the cooperation of memory address logic unit 25 and memory 20. Memory address logic 25 is essentially a decoder, for example a binary-to-decimal converter. As illustrated in FIG. 3, the signal applied from memory address counter 26 to memory address logic unit 25 is a binary coded count signal. FIG. 3, for ease of illustration, shows memory 20 as having 16 memory locations. In a practical device, of course, a considerably larger number of locations would be provided; however, FIG. 3 depicts only 16 for ease of illustration. The binary coded memory address signal from counter 26 is converted by memory address logic unit 25 to a decimal signal representing the address of the memory location within memory 20 selected to have its contents displayed. FIG. 3, as an illustrative example, depicts the memory address counter signal as a binary signal 0010, representing the decimal number 2. In response to this signal, memory address logic unit 25 actuates memory 20 to activate the memory output lines 23 to provide as an output the binary signal stored in its memory location number 2. This signal is applied by line 23 to buffer 21 (FIG. 2).

The signal from memory 20 may consist of two parts. FIG. 3 illustrates the signal as a binary signal of eight bits. In a two-part signal, the first several bits, for example the lower order five bits, encode the text material to be displayed while the remaining bits, for example the higher order three bits, encode indexing information. Alternatively, the entire eight bits can both encode the text material and be monitored for indexing.

From buffer 21 the textual material signals are applied to digital comparator 22 which also receives the output from input register 24. So long as the selected textual material indicated by the signals from buffer 21 do not correspond with the textual material signal stored in input register 24, memory address counter 26 continues to advance the memory address logic circuit 25 to continue the memory scanning. When the textual material signals from buffer 21 correspond with the textual material as indicated by the signal on line 38 to memory address counter 25, inhibiting opeation of the counter and thus stopping scanning of the memory. In addition, digital comparator 22 energizes indicator 14. Read switch 7 is then depressed, causing memory address counter 26 to apply signals to memory address logic 25 at a slower rate. The bits of the signal which correspond to the desired display are applied to display driver 27 which actuates display device 13 to display the textual material at the desired slower rate, suitable for reading.

If additional memory capacity is desired, an external memory 28 is coupled through modem 33 and connector 6 to the remaining circuitry. Signals from memory address logic 25 pass through auxiliary address logic 32 and connector 6 to line 42 and modem 33. The returning signals are applied by line 41 and connector 6 to buffer 21. Auxiliary switch 16 couples the output of buffer 21 to these signals from connector 6, rather than to the signals on line 43 from memory 20. The balance of the operation is substantially the same.

While various components have been disclosed in the preferred embodiment, alternative components could be utilized. Thus, for example, an alternative keyboard could be utilized in place of keyboard 12, with each key controlling two letters, numbers, or other characters. The more frequently used character would be entered by actuating the key one time, while the other character would be entered by actuating the key twice within a limited time period. The characters could be stored and then entered upon actuation of a subsequent key. Other variations could be incorporated. Thus, although the present invention has been described with reference to preferred embodiments, numerous modifications and rearrangements could be made, and still the result would come within the scope of the invention.

What is claim is:

1. A reading machine for providing a visual display of selected textual material comprising:
   addressable memory means for storing textual material in digital form, said memory means comprising a read only memory including output means for providing digital output signals of textual material at selected addresses in said memory means;
   addressing means for applying selected address signals to said memory means to cause said memory means to apply textual material at the corresponding selected addresses to said output means;
   text selection means for indicating textual material to be displayed;
   comparison means coupled to said output means, to said text selection means, and to said addressing means for inhibiting application of selected address signals from said addressing means to said memory means when the textual material at said output means corresponds with the textual material indicated by said text selection means;
   a second memory device, coupling means connected to said read only memory, to said second memory device and to said comparison means and capable of assuming a first state in which said read only memory is coupled to said comparison means and a second state in which said second memory device is coupled to said comparison means;
   control means for causing said coupling means alternatively to assume its first state or to assume its second state; and
   display means coupled to said output means for forming a visual display of textual material applied from said output means to said display means.

2. A reading machine as claimed in claim 1 in which said memory means comprises a solid state memory.

3. A reading machine as claimed in claim 1 in which said memory means comprises a floppy disc.

4. A reading machine as claimed in claim 1 in which said addressing means comprises:
- address counter means for generating count signals; and
- address logic means responsive to count signals from said address counter means for generating selected address signals.

5. A reading machine as claimed in claim 4 in which said addressing means further comprises rate control means for controlling the rate at which said address counter means generates count signals.

6. A reading machine as claimed in claim 5 in which said addressing means further comprises clock means for generating clock pulse signals, and in which said address counter means counts clock pulse signals to generate count signals.

7. A reading machine as claimed in claim 6 in which said rate control means comprises means for applying clock pulse signals from said clock means to said address counter means at a first pulse rate and means for alternatively applying clock pulse signals from said clock means to said address counter means at a second rate which is an integral multiple of said first rate.

8. A reading machine as claimed in claim 7 in which said rate control means comprises a binary scaler.

9. A reading machine for providing a visual display of selected textual material comprising:
- addressable memory means for storing textual material in digital form, said memory means including output means for providing digital output signals of textual material at selected addresses in said memory means;
- addressing means for applying selected address signals to said memory means to cause said memory means to apply textual material at the corresponding selected addresses to said output means;
- text selection means for indicating textual material to be displayed which comprises;
- a keyboard including a plurality of text indicating keys for indicating textual material to be displayed;
- a digital code generator connected to said keyboard and responsive to actuation of the keys for generating digital code signals indicative of the actuated keys;
- comparison means coupled to said output means, to said text selection means, and to said addressing means for inhibiting application of selected address signals from said addressing means to said memory means when the textual material at said output means corresponds with the textual material indicated by said text selection means; and
- display means coupled to said output means for forming a visual display of textual material applied from said output means to said display means.

10. A reading machine as claimed in claim 9 in which each key of said keyboard is adapted to indicate one letter when actuated once and to indicate another letter when actuated twice within a preset time.

11. A reading machine as claimed in claim 1 in which said display means comprises a light emitting diode display.

12. A reading machine as claimed in claim 1 in which said display means comprises a liquid crystal display.

13. A reading machine as claimed in claim 1 in which said display means comprises a plasma display.

* * * * *